US012614886B2

(12) United States Patent
Bergner et al.

(10) Patent No.: US 12,614,886 B2
(45) Date of Patent: Apr. 28, 2026

(54) GENERATING MULTIPLE LASER PULSES BY SUPERIMPOSING LASER RADIATION

(71) Applicants: Fraunhofer-Gesellschaft zur Förderung der angewandten Forschung e.V., Munich (DE); Friedrich-Schiller-Universität Jena, Jena (DE)

(72) Inventors: Klaus Bergner, Jena (DE); Stefan Nolte, Jena (DE); Martin Gebhardt, Apolda (DE)

(73) Assignees: Fraunhofer-Gesellschaft Zur Förderung Der Angewandten Forschung E. V, Munich (DE); Friedrich-Schiller-Universität Jena, Jena (DE)

( * ) Notice: Subject to any disclaimer, the term of this patent is extended or adjusted under 35 U.S.C. 154(b) by 0 days.

(21) Appl. No.: 16/644,065

(22) PCT Filed: Sep. 4, 2018

(86) PCT No.: PCT/EP2018/073751
§ 371 (c)(1),
(2) Date: Mar. 3, 2020

(87) PCT Pub. No.: WO2019/043256
PCT Pub. Date: Mar. 7, 2019

(65) Prior Publication Data
US 2020/0412076 A1      Dec. 31, 2020

(30) Foreign Application Priority Data

Sep. 4, 2017    (DE) ..................... 10 2017 120 310.9
Sep. 13, 2017   (DE) ..................... 10 2017 121 147.0

(51) Int. Cl.
*H01S 3/00*      (2006.01)
*H01S 3/23*      (2006.01)

(52) U.S. Cl.
CPC .......... *H01S 3/0057* (2013.01); *H01S 3/2391* (2013.01)

(58) Field of Classification Search
CPC ....... H01S 3/0057; H01S 3/005; H01S 3/2391
See application file for complete search history.

(56) References Cited

U.S. PATENT DOCUMENTS

| | | | | | |
|---|---|---|---|---|---|
| 4,745,618 | A | * | 5/1988 | Burger .................... | H01S 3/081 372/101 |
| 5,015,964 | A | * | 5/1991 | O'Mahony .......... | G02B 6/4202 359/347 |

(Continued)

OTHER PUBLICATIONS

Amada, "Single Mode Fiber Laser Markers Offer Processing Advantages", 2020, Amada weld tech inc., pp. 1-5. (Year: 2020).*

(Continued)

*Primary Examiner* — Michael Carter
(74) *Attorney, Agent, or Firm* — Adams & Reese LLP; John Henry Scott, III

(57)                ABSTRACT

The invention relates to a device for generating a sequence of laser pulses consisting of pulse bursts. The object of the invention is to provide a possibility of generating laser pulses for material processing in the burst mode at a high quality based on the principle of beam combination. To that end, the invention proposes a device, comprising:

at least one laser (1, 14, 15) which generates pulsed laser radiation in the form of a sequence of temporally equidistant individual pulses, a combination element (4) which superimposes the laser radiation supplied to the combination element (4) via at least two spatially separate input beam paths of different length, into pulse bursts in an output beam path (9), (Continued)

a coupling optics (10) arranged in the output beam path (9), an optical waveguide (11), wherein the coupling optics (10) couples the laser radiation superimposed in the output beam path (9) into the optical waveguide (11) at the input side thereof, and wherein the optical waveguide (11) guides the laser radiation primarily in a fundamental mode, and a decoupling optics (12) which couples out the laser radiation from the optical waveguide (11) at the output side thereof. Furthermore, the invention relates to a corresponding method.

16 Claims, 2 Drawing Sheets

(56) References Cited

U.S. PATENT DOCUMENTS

| | | | | |
|---|---|---|---|---|
| 5,225,925 A | * | 7/1993 | Grubb | H01S 3/06708 |
| | | | | 359/341.32 |
| 6,098,264 A | * | 8/2000 | Harrigan | B41J 2/465 |
| | | | | 29/464 |
| 10,036,850 B2 | * | 7/2018 | Suzuki | G02B 6/02342 |
| 2011/0267671 A1 | * | 11/2011 | Peng | H01S 3/115 |
| | | | | 359/257 |
| 2015/0117481 A1 | * | 4/2015 | Brons | H01S 3/0604 |
| | | | | 372/30 |

OTHER PUBLICATIONS

Limpert, "Yb-doped large-pitch fibres: effective single mode operation based on higher order mode disclocalisation," Mar. 25, 2012, Light: Science and Applications, pp. 1-5. (Year: 2012).*

Kienel, "Energy scaling of femtosecond amplifiers using actively controlled divided-pulse amplification," Feb. 15, 2014, Optics Letters, vol. 39, No. 4, pp. 1049-1052. (Year: 2014).*

M. Kienel, A. Klenke, T. Eidam, S. Hadrich, J. Limpert and A. Tunnermann, "Energy Scaling of Femtosecond Amplifiers Using Actively Controlled Divided-Pulse Amplification", Optics Letters, vol. 39, No. 4, Feb. 15, 2014, pp. 1049-1052.

C. Kerse, H. Kalaycioglu, P. Elahi, O. Akcaalan and F. O. Ilday, "3.5-GHz intra-burst repetition rate ultrafast Yb-doped fiber laser", Optics Communications 366 (2016), pp. 404-409.

CorActive High-Tech, Inc. YB 401-PM Yb Doped Single Clad PM Fiber, 1 page.

* cited by examiner

GENERATING MULTIPLE LASER PULSES BY SUPERIMPOSING LASER RADIATION

The invention relates to a device and a method for generating a repetition of laser pulses consisting of pulse bursts.

Short-pulse laser have established as a tool that can be variably used in high-precision material processing over the last years. Ultrashort laser pulses (with a pulse duration of <10 ps) show advantages over longer laser pulses (with a pulse duration in the ns range) due to a smaller heat input into the workpiece (so-called cold ablation). The processing speed is determined by the pulse repetition rate of the short pulse laser. In order to allow a cost-efficient processing, high-repetition laser systems were developed in the last years. At a given pulse energy, this also means a likewise increased average power. It could be shown that, at an increasing average power, a heat input into the workpiece and thus a damaging of the workpiece and a reduction of the processing quality can not be avoided even at shortest pulse durations (femtosecond pulses), since the input heat accumulates.

In order to reduce such a damaging effect at a high average power of the repetition of laser pulses, it was proposed to use a so-called burst mode instead of an equidistant pulse distance (with a typical pulse repetition rate in the range of 10 kHz to 10 MHz, corresponding to a temporal pulse distance of 10 ms to 10 μs). In other words, a sequence of a certain number of laser pulses with small temporal distance (so-called micro-pulse repetition rate)<10 ns, ideally <200 ps, form a pulse packet (burst) and further pulse packets follow at a larger temporal distance (so-called macro pulse rate) (again in the range of ms to μs).

This approach can be traced back to the limited propagation speed of the input heat into the workpiece. If the pulse distance is so small that heated material is removed by the quickly following pulse, the heat input into the workpiece can be reduced significantly, whereby excellent processing results can be expected event at highest average power (see U.S. Pat. No. 6,552,301). Furthermore, metastable states in the ps- and μs-range can be utilized in the volume processing of transparent workpieces in a targeted manner in order to achieve a more efficient coupling or energy transfer.

It is known from the prior art to generate a repetition of laser pulses consisting of pulse bursts by pulse division and pulse combination. This method is based on the division of a pulsed laser beam into separate beam paths of different length, and the utilization of different propagation times along these beam paths. A sequence of beam paths of different length allows the split-up of individual pulses of the original repetition of laser pulses into a plurality of pulses. The individual beams are superimposed, i.e. combined, into an individual output beam after passing through the different beam paths. A pulse burst with a very short pulse distance and thus a high micro pulse repetition rate can be generated by the use of this approach.

The above described method uses a volume-optical structure with free beam propagation. In this case, the precise superposition of the partial beams at the interaction point in the material to be processed is a technical challenge. Smallest deviations of the beam position, divergence or angular errors of one partial beam to another partial beam result in a processing at different positions in the material volume. As a result, the desired temporal energy adjustment is no longer ensured, and the energy is introduced in a spatially non-uniform manner.

Furthermore, a processing can be effected by means of temporally offset laser pulses by means of two or multiple mutually synchronized but different lasers. In this case, e.g. different wavelengths or different pulse durations of the individual laser beams can be used for the tailored adjustment of the interaction dynamics with the material to be processed. However, this approach also leads to problems regarding the exact superposition of the partial beams during the processing. Due to the possibly long interaction distances and high aspect ratios, even smallest changes of the beam characteristics (e.g. wave front, divergence, beam diameter, etc.) cause position deviations of the partial beams, which in turn contradicts the controlled and cumulatively-acting interaction of the multi-pulses.

Against this background, it is the object of the invention to indicate an option for generating laser pulses for material processing in burst mode, with high quality and an as perfect superimposition as possible of the respective partial beams in the workpiece volume, based on the principle of beam combination.

The invention achieves the object by means of a device for generating a repetition of laser pulses consisting of pulse bursts, having:

at least one laser which generates pulsed laser radiation in the form of a sequence of temporally equidistant individual pulses, a combination element which superimposes the laser radiation supplied to the combination element via at least two spatially separate input beam paths of different length, into pulse bursts in an output beam path, a coupling optics arranged in the output beam path, an optical waveguide, wherein the coupling optics couples the laser radiation superimposed in the output beam path into the optical waveguide at the input side thereof, and wherein the optical waveguide guides the laser radiation primarily in a fundamental mode, and a decoupling optics which couples out the laser radiation from the optical waveguide at the output side thereof.

Furthermore, the invention achieves the object by a method for generating a repetition of laser pulses consisting of pulse bursts, comprising the following method steps:

generating pulsed laser radiation in the form of a sequence of temporally equidistant individual pulses, splitting the laser radiation to at least two spatially sperate input beam paths of different length;

superimposing the laser radiation propagating along the at least two input beam paths into pulse bursts in an output beam path, coupling the superimposed laser radiation propagating along the output beam path into an optical waveguide, wherein the optical waveguide guides the laser radiation primarily in a fundamental mode, and coupling out the laser radiation from the optical waveguide.

The method according to the invention achieves an inherently very good superposition of the partial beams, i.e. of the laser radiation supplied to the combination element via the spatially separate input beam paths after the coupling out from the optical waveguide, i.e. correspondingly at the point of interaction with the material of the workpiece to be processed. In this case, as in the case of the conventional technique of pulse splitting and combination, a temporal splitting of an individual pulse into multi-pulses with variably adjustable temporal distances as well as pulse energies can be implemented.

The core of the invention lies with the coupling of superimposed partial beams, i.e. the laser radiation supplied via the separate input beam paths, into the optical waveguide, which preferably is an optical fiber. In this case, the optical waveguide is configured in such a way that it withstands the power of the laser radiation and substantially only guides the fundamental modes of the partial beams. A hollow core fiber, a Kagome fiber, a photonic crystal fiber or a large-mode-area (LMA) fiber is suitable as an optical waveguide having these properties, for example. Higher modes of the laser radiation are subject to higher losses in the optical waveguide than the fundamental mode, and are correspondingly not guided. The fundamental mode in the optical waveguide can be excited by a corresponding adjustment of the coupling optics already during the coupling. Deviations in terms of the beam position or direction lead more and more to the excitation of higher modes in the optical waveguide for the respective partial beam. Thus, these radiation components are attenuated. The laser radiation that has been cleaned in this way as a combination of the partial beams originally supplied via the separate input beam paths, but now with an identical beam position and direction after passing through the optical waveguide, exits the optical waveguide and is collimated by means of a decoupling optics, and is available for material processing.

The use of an optical fiber as an optical waveguide for laser beam cleaning (see R. L. Abrams, IEEE Journal of Quantum Electronics 8, 838-843, 1972) is known per se from the prior art, but not so the use for beam combination and formation according to the invention. By imaging the partial beams shaped by the optical waveguide, by means of the decoupling optics, the partial beams are located exactly one on top of the other in all spatial directions and across long interactions distances.

As explained above, pulse laser radiation is used for the material processing. The input beam paths prior to coupling into the optical waveguide have different lengths in order to achieve the desired temporal offset of the laser pulses by the beam combination, and thus a micro pulse repetition rate sufficient for practical applications.

Exemplary embodiments of the invention will hereinafter be explained in more detail with reference to the drawings, in which.

Figure 1:
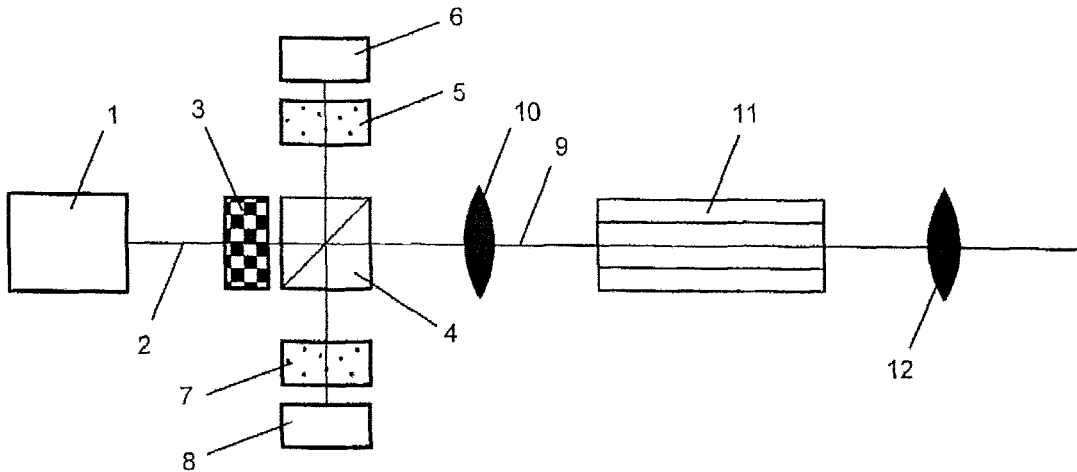
FIG. 1 is a schematic illustration of a first exemplary embodiment of a device according to the invention.

The construction of the device according to FIG. 1 is similar to that of a Michelson Interferometer. The device is used to generate pulsed laser radiation in the form of a repetition of double pulses from a sequence of temporally equidistant individual pulses. An input laser beam 2 consisting of pulsed laser radiation, that is, a repetition of laser pulses of temporally equidistant laser pulses, is generated by means of a conventional short-pulse laser 1. The incident laser pulses are polarized by means of a λ/2 wave plate 3 according to the desired pulsed energy distribution. The input laser beam 2 is split into two input beam paths by means of a polarization beam splitter 4. A first partial beam unobstructedly passes the polarization beam splitter 4 along a first input beam path according to the polarization of the input laser beam 2. The orthogonally-polarized portion of the input laser beam 2, i.e. the second partial beam, is deflected, passes a λ/4 wave plate 5 and thereafter is reflected on a mirror 6. The laser beam then once again passes the λ/4 wave plate 5 and thereby receives a polarization rotated by 90°, whereby the laser beam is able to pass the polarization beam splitter 4 unobstructedly. Due to another polarization rotation by passing through another λ/4 wave plate 7, reflection on another mirror 8, a further polarization rotation and finally reflection on the polarization beam splitter 4, the second partial beam is guided into the same direction as the first partial beam. The passing through the two arms from the polarization beam splitter 4 to the mirror 6, from there to the mirror 8, and from there back to the polarization beam splitter 4 describes a second input beam path in the context of the invention. Owing to the freely-adjustable path length between the mirrors 6 and 8, a variable time separation of the laser pulses is made possible. The polarization beam splitter 4 serves as a combination element, which superimposes the laser radiation supplied via the two input beam paths in an output beam path 9. The superimposed laser radiation passes through coupling optics 10 and is coupled into an optical waveguide 11 in the form of a fiber. In this case, the optical waveguide is configured in such a way that it withstands the power of the laser radiation and substantially only guides the fundamental modes of the two superimposed partial beams. Higher modes are subject to higher losses in the optical waveguide 11, and are not guided. Deviations in terms of the superimposed partial beams in view of beam position and direction increasingly lead to the excitation of higher modes in the optical waveguide. These components are therefore attenuated. The laser radiation cleaned this way and coupled out from the optical waveguide by means of the optical waveguide 11, exits the device with identical beam position and beam direction of the superimposed partial beams.

Figure 2:
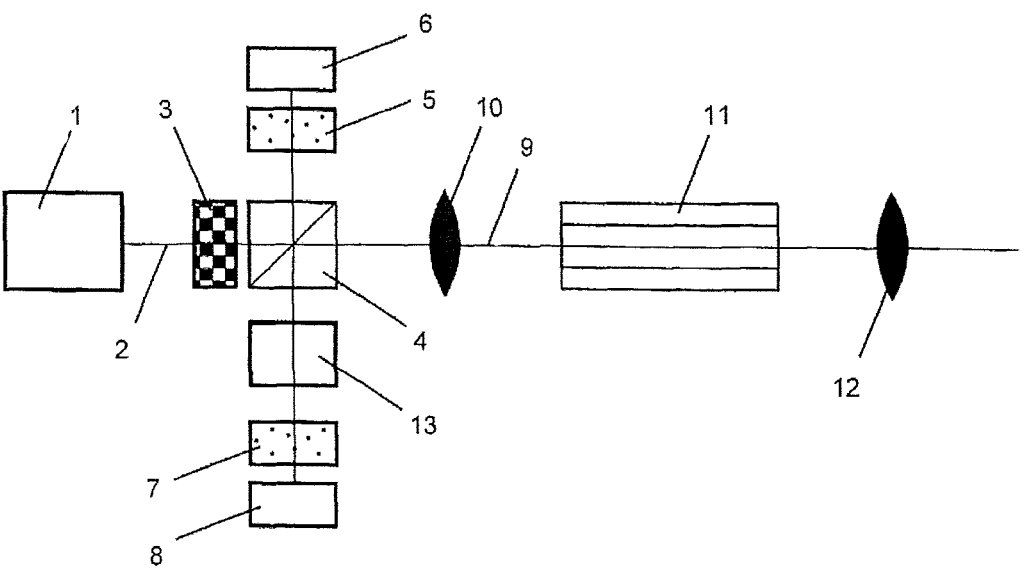
FIG. 2 is a schematic illustration of a second exemplary embodiment of a device according to the invention.

In the exemplary embodiment of FIG. 2, the option of a temporal beam shaping within the reflected partial beam (second input beam path) is additionally provided. The integration of a temporal beam shaper 13 (e.g. a dispersive optical element, grid stretchers, compressors, Spatial Light Modulator etc.) makes it possible to influence the temporal pulse shape. This way, pulses longer or shorter than in the transmitted partial beam can be achieved, whereby the temporal shape of the laser pulses can be adapted to the process dynamics during material processing, for example in order to enhance or trigger thermal or other relaxation processes in the processed material.

For generating the pulse bursts from more than two laser pulses, the arrangements of polarization beam splitter 4, mirrors 6, 8, λ/4 wave plates 7, 8 and possibly beam shaper 13, illustrated in FIGS. 1 and 2, can correspondingly be used one after the other multiple times, wherein the output of an arrangement respectively forms the input of the next arrangement. A series connection of a number N of such arrangements results in 2N laser pulses per burst.

Figure 3:
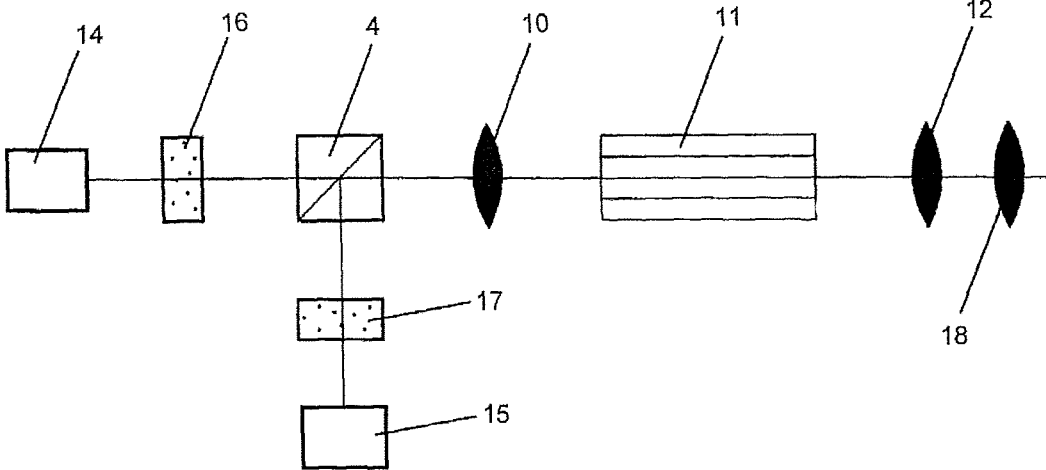
FIG. 3 is a schematic illustration of a third exemplary embodiment of a device according to the invention.

In order to allow for a processing with two different laser systems, a system according to FIG. 3 can be used. The laser radiation emitted by two lasers 14, 15, which e.g. emit laser radiation at a respectively different wavelength, propagates along two separate input beam paths to the polarization beam splitter 4. There, the laser radiation, after polarization adaption, is combined using two λ/2 wave plates 16, 17. Subsequently, both partial beams pass the coupling optics 10 and are coupled into the optical waveguide 11. Here, the beam characteristics (e.g. wave front, divergence, beam diameter etc.) are in turn adapted to the fundamental mode (similar to the exemplary embodiments illustrated in FIGS. 1 and 2). In the case of different wavelengths of lasers 14,15, also a wavelength-selective mirror, which transmits at the wavelength of laser 14 and reflects at the wavelength of laser 15, can be used as a combination element. In this case, the λ/2 wave plates 16, 17 can be dispensed with. At different wavelengths, attention must however be paid to the fact that the optical waveguide 11 guides both wavelengths only in the fundamental mode, and is not multimodal. The laser radiation that has been cleaned and combined in this way exits the optical waveguide 11 and is collimated by means of the decoupling optics 12, so that it is available for material processing then. In the case of different wavelengths, in addition a chromatically-adjusted optics 18, or an achromatic optics, is used to ensure an identical beam position of both partial beams.

The invention claimed is:

1. Device for generating a repetition of laser pulses consisting of pulse bursts, having at least one laser which generates pulsed laser radiation in the form of a sequence of temporally equidistant individual pulses;
   a combination element which superimposes the laser radiation supplied to the combination element via at least two spatially separate input beam paths of different length, into pulse bursts in an output beam path;
   a coupling optics arranged in the output beam path;
   an optical waveguide, which is a hollow core fiber, a Kagome fiber, or a large-mode-area fiber, wherein the coupling optics couples the laser radiation superimposed in the output beam path into the optical waveguide at the input side thereof, wherein higher modes are excited in the optical waveguide due to a configuration of the device with deviations of the superimposed laser radiation with respect to the beam position or direction, and wherein the optical waveguide guides the laser radiation primarily in a fundamental mode, so that the laser radiation propagating in the optical waveguide experiences a higher loss in higher modes than in the fundamental mode; and
   a decoupling optics which couples out the laser radiation from the optical waveguide such that the laser radiation is available for material processing at an output side of the decoupling optics.

2. Device according to claim 1, wherein the optical waveguide guides the laser radiation only in the fundamental mode.

3. Device according to claim 2, wherein in at least one of the input beam paths, at least one reflector is arranged, which reflects the laser radiation along the input beam path in itself.

4. Device according to claim 2, wherein in that in at least one of the input beam paths at least one λ/4 wave plate is arranged, which is passed through by the laser radiation propagating along the that input beam path twice in a back and forth direction.

5. Device according to claim 1, wherein the combination element is a polarization beam splitter which splits an individual input laser beam into the at least two spatially separate input beam paths and superimposes the laser radiation propagating along the input beam paths in the output beam path.

6. Device according to claim 5, wherein the input laser beam passes a λ/2 wave plate before being split into the input beam paths by the polarization beam splitter.

7. Device according to claim 1, further comprising two or more lasers for generating pulsed laser radiation, wherein each of the input beam paths is respectively assigned one laser.

8. Device according to claim 7, wherein each laser generates laser radiation at a different wavelength.

9. Device according to claim 1, wherein the combination element is a wavelength-selective mirror.

10. Method for generating a repetition of laser pulses consisting of pulse bursts, comprising the following method steps:
   generating pulsed laser radiation in the form of a sequence of temporally equidistant individual pulses;
   splitting the laser radiation into at least two spatially separate input beam paths of different length;
   superimposing the laser radiation propagating along the at least two input beam paths into pulse bursts in an output beam path;
   coupling the superimposed laser radiation propagating along the output beam path into an optical waveguide, coupling the superimposed laser radiation propagating along the output beam path into an optical waveguide, which is a hollow core fiber, a Kagome fiber, or a large-mode- area fiber, wherein higher modes are excited in the optical waveguide due to deviations of the superimposed laser radiation with respect to the beam position or direction, and wherein the optical waveguide guides the laser radiation primarily in a fundamental mode, so that the laser radiation propagating in the optical waveguide experiences a higher loss in higher modes than in the fundamental mode; and
   coupling out the laser radiation from the optical waveguide such that the laser radiation is available for material processing at an output side of a decoupling optical element.

11. A device comprising:
   a laser to generate pulsed laser radiation formed as a sequence of temporally equidistant individual pulses;
   a combination element coupled to the laser by an input path, wherein the laser radiation propagates from the laser to the combination element via the input path, the combination element superimposes first and second portions of the laser radiation into pulse bursts in an output beam path, the first portion of the laser radiation propagating along a first input beam path prior to being superimposed, the second portion of the laser radiation propagating along a second input beam path prior to being superimposed, the first and second input beam paths having different lengths;
   coupling optics arranged in the output beam path;
   an optical waveguide with an input side coupled to the coupling optics, the coupling optics to couple the laser radiation superimposed in the output beam path into the input side of the optical waveguide such that higher modes are excited in the optical waveguide due to a configuration of the device with deviations of the superimposed laser radiation with respect to beam position or direction, the optical waveguide to guide the laser radiation primarily in a fundamental mode such that laser radiation propagating in the optical waveguide experiences a higher loss in the higher modes than in the fundamental mode; and
   decoupling optics to couple out the laser radiation from the optical waveguide such that the laser radiation is available for material processing at an output side of the decoupling optics.

12. The device of claim 11, wherein the laser radiation at the output side of the decoupling optics comprises a repetition of laser pulses consisting of pulse bursts.

13. The device of claim 11, wherein the combination element is a polarization beam splitter which splits an individual input laser beam into the first and second input beam paths, and the polarization beam splitter superimposes the laser radiation propagating along the first and second input beam paths into the output beam path.

14. The device of claim 13, wherein the input laser beam passes a $\lambda/2$ wave plate before being split into the first and second input beam paths by the polarization beam splitter.

15. The device of claim 13, wherein at least one input beam path of the first and second input beam paths includes a reflector to reflect the laser radiation along that input beam path into itself.

16. The device of claim 13, wherein at least one input beam path of the first and second input beam paths includes a 2/4 wave plate through which the laser radiation propagating along that input beam path passes twice in a back and forth direction.

\* \* \* \* \*